United States Patent Office 2,721,305
Patented Oct. 18, 1955

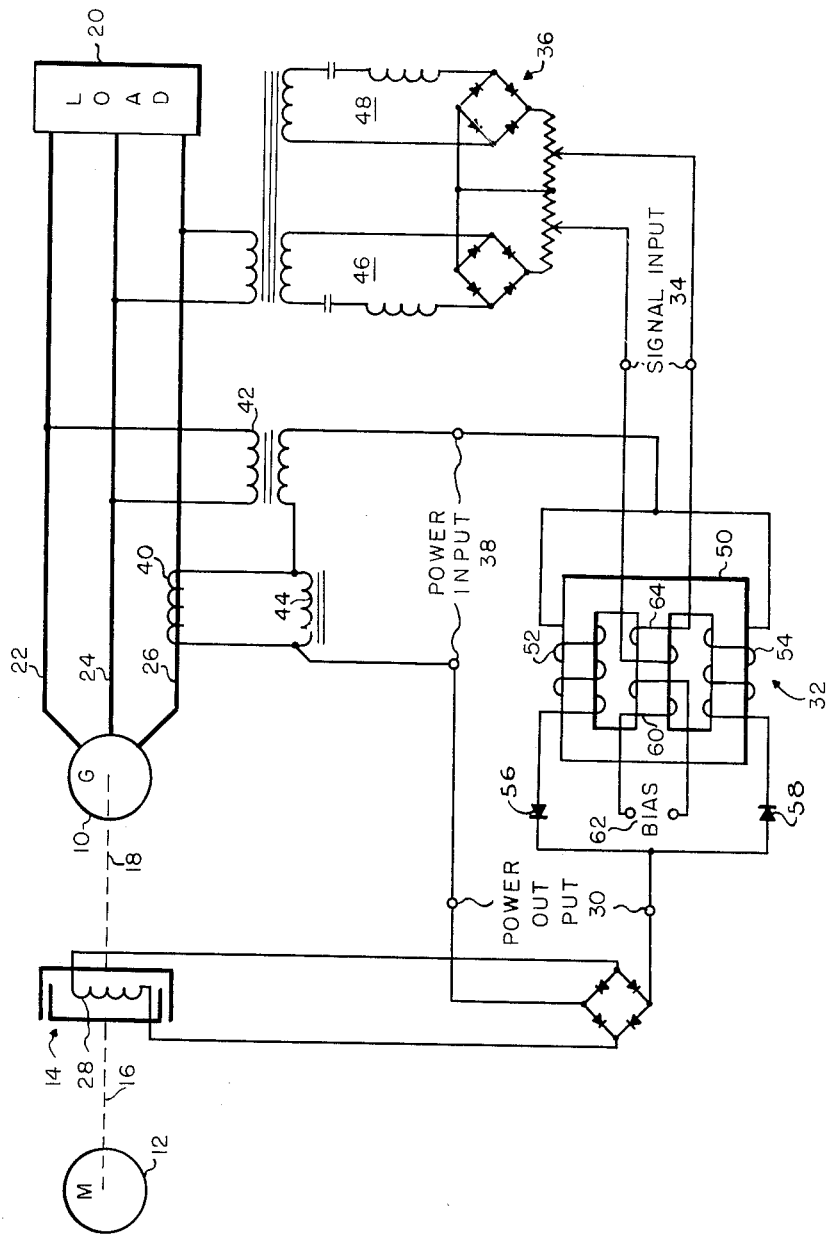

2,721,305

DRIVING CONTROL FOR ELECTRIC GENERATOR

Stephan Steinitz, St. Louis, Mo., assignor to Vickers Incorporated, Detroit, Mich., a corporation of Michigan Application November 18, 1952, Serial No. 321,206

19 Claims. (Cl. 322—24)

This invention relates to power transmission and more particularly to speed regulation of alternating current generators.

Alternating current generator systems wherein speed regulation is effected by controlling either the prime mover or a controllable slip coupling between the prime mover and the generator with a speed or frequency responsive signal are subject to sluggish response when changes occur in the true load on the generator. For example, a sudden application or increase of true load (resistive load component) on the generator requires more input torque to maintain a given generator speed. However, before the usual speed regulator can increase the input torque the speed must actually first drop before the speed regulator can sense the change and transmit a compensatory signal to change the input torque.

This invention contemplates a speed regulating system for a generator which will respond not only to frequency or speed changes, but also to changes in load. The system of the present invention provides rapid response to changes of generator load to regulate the driven power supplied to the generator in accordance with the generator load demands.

The speed regulation in response to generator load is effected by energizing an electric speed or torque control element such as a motor or clutch winding from the output of a speed regulator amplifier controlled by a speed or frequency responsive signal and powered by a voltage responsive to changes in the generator load.

Accordingly, it is an object of this invention to provide a novel speed regulator for an A. C. generator.

Another object is to provide a novel generator speed regulator which responds rapidly to load changes on the generator.

Another object is to provide a novel load and speed responsive system for controlling the input drive to an A. C. generator.

Other and further objects and advantages of the present invention will be apparent from the following description, reference being had to the accompanying drawing wherein a diagram of a preferred form of the present invention is clearly shown.

Referring now to the drawing, an A. C. generator 10 is driven by a prime mover such as an electric motor 12 through a controllable slip coupling 14, for example a magnetic particle clutch. Shafts 16 and 18 connect the motor and the generator to the clutch members. The generator is shown supplying a load 20 through conductors 22, 24, and 26. Circuit breakers, relays and other controls normally employed in generator systems, are omitted for clarity. Generator field excitation may be supplied by any conventional apparatus for the purpose. Torque transfer or slip between the coupling elements of the clutch is controlled by an excitation winding 28 which is supplied with current from the power output 30 of an amplifier 32, provided with a signal input 34 connected to a frequency responsive network 36 coupled to the output of the generator.

The power input 38 of the amplifier is supplied with voltage, derived from the load circuit, and variable with the load and its power factor variation. Ignoring for the moment the effects of any signal at the amplifier signal input, the voltage supplied to the amplifier power input 38 should vary with the load and its power factor in such manner that the excitation supplied to the winding 28 will regulate the driving power supplied to the generator in accordance with the load requirements of the generator. For example, if the true load (resistive component) on the generator increases, the applied torque should be increased, and the reverse should ensue if the resistive component of the generator load is reduced. To obtain these results in the case of the clutch system illustrated, excitation supplied to the clutch must increase as the true load increases and vice-versa. This is effected by supplying the amplifier power input 38 with a vectorial combination of two voltages derived from the load circuit, one variable with the load current and variable in phase with the phase of the load current as related to the voltage across the load, the other voltage being variable in response to the voltage supplied to the load. The derived voltages are properly phased so that when combined they will be in phase for unity power factor load components and 90° out of phase for reactive loads.

In the circuit shown, the voltage which is proportional to the load current and in fixed phase relation thereto is derived from a current transformer 40 coupled to the supply conductor 26. The voltage which is dependent on the voltage supplied to the load is derived from a potential transformer 42 connected across supply conductors 22 and 24. The secondaries of the respective transformers are connected together to vectorially combine the secondary voltages and thus combined supply them to the power input 38 of the amplifier 32.

As is well known the phase of the voltage across the secondary of a current transformer depends on the transformer load. In order that the derived voltages be in phase for resistive components of generator load, the combining network or the transformer connections must be properly arranged to provide the necessary phase relations. This may be effected as shown by loading the current transformer with a reactor 44, preferably with an iron core having an air gap to provide more linear characteristics. With this arrangement the voltages across the secondaries of the respective transformers 40 and 42 will be in phase for resistive generator loads and 90° out of phase with reactive generator loads. It will be appreciated that this particular phasing may be accomplished with a resistive load on the current transformer and a phase shift in the potential transformer arrangement which may be effected by a Scott transformer connection.

The frequency sensitive network 36 comprises two tuned circuits 46 and 48, one resonating above and the other resonating below the desired operating frequency, the rectified output voltages of the two circuits being connected in opposition to produce a net differential voltage which will have a value and polarity indicative of the deviation, if any, from the desired operating frequency. This differential output voltage is supplied as a speed or frequency responsive signal to the amplifier signal input 34 in order to control the coupling 14 in such manner as to correct for any variations in generator speed as might occur.

As seen in the drawing, the amplifier 32 is preferably a self-saturating magnetic amplifier having a saturable core structure 50 carrying a pair of main windings 52 and 54 connected in series between the power input and output of the amplifier. Reversely related rectifiers 56 and 58, are connected in series with each main winding to provide self-saturation. Magnetic bias for the core 50 may be provided at any suitable magnetic level by means of a bias winding 60 connected to a suitable source of bias current 62. The impedance of the windings 52 and 54 is controlled in accordance with variations of the generator frequency by means of a flux control winding 64 carried by the core 50 and connected to the output of the frequency responsive circuit 36.

Flux conditions in the core 50 caused by changes in magnetic saturation by the frequency signal in the control winding 64, control the output of the amplifier, and consequently the coupling 14, in accordance with the changes in generator frequency or speed. The amplifier control is such that when frequency drops below the desired operating frequency the excitation of clutch winding 28 is changed to decrease the clutch slip and increase the torque transfer thereby to increase the speed of the generator, and conversely when the generator speed rises above the normal frequency, the clutch slip is increased to reduce the speed of the generator.

Thus, it is seen that the clutch excitation provided by the amplifier is responsive to changes in the load and its power factor and also to generator frequency or speed. The response to changes in load and power factor is such that when the resistive load component on the generator increases, more torque is supplied to the generator, and the converse when the resistive load decreases. Clutch slip is reduced to apply increased torque to the generator, and the slip is increased to decrease the torque transfer.

In the arrangement shown in the drawing the clutch slip is decreased by increasing the excitation current in the winding 28. However, other coil arrangements, such as bucking coils, may require a decrease in coil current to decrease the clutch slip and increase torque transfer. In that case the voltages derived from the secondaries of transformers 40 and 42 should be so phased that for resistive generator loads these voltages will be vectorially combined in phase opposition. The same would apply when the clutch 14 is dispensed with and the amplifier output 30 is employed to control the isolated main field of a main field D. C. motor prime mover.

While the disclosure shows the amplifier output current as being rectified before reaching the clutch winding 28, it will be appreciated that the rectifier may be omitted where the control coil or element for controlling the input power supplied to the generator may be operated with alternating current. It is to be understood that the invention is not confined to control of torque through a clutch. For example, instead of a clutch winding, the winding 28 may be a motor control winding for controlling the energy delivered to the motor employed as a prime mover.

It is to be further understood that the present invention is not confined to the use of magnetic amplifiers in the control circuit. Any suitable amplifier may be used as long as the power supply therefor is a voltage responsive to the generator load and its power factor. Also, it should be understood that since generator speed and frequency are interrelated the amplifier signal input may be supplied from a speed indicator such as a tachometer generator or the like.

An important advantage of the present invention is that the power response action which anticipates the speed response permits the use of an amplifier that is smaller than ordinarily required by a system which is speed responsive only.

While the form of embodiment of the invention as herein disclosed constitutes a preferred form, it is to be understood that other forms might be adopted, all coming within the scope of the claims which follow.

What is claimed is as follows:

1. A regulating system for a generator connected to a load circuit and driven by a motor, said system comprising an electrical control element for controlling the driving power supplied by the motor to the generator, means for deriving from the load circuit a voltage variable in response to power factor changes of the load circuit, an amplifier having an output, a signal input and a power supply input, means for applying said voltage to said power supply input, means for obtaining a signal responsive to the generator's speed, means for applying said signal to said signal input, and means for supplying said control element with current from said output, said voltage being variable with power factor in such manner that it will cause the control element to regulate the torque applied to the generator in accordance with the load circuit requirements.

2. A regulating system for a generator connected to a load circuit and driven by a motor, said system comprising an electric control element for controlling the driving power supplied by the motor to the generator, an amplifier having a power output, a power input and a signal input, means for supplying said power input with a voltage derived from the generator load circuit and changeable in response to load and power factor variation of the load circuit, means for supplying to said signal input a signal responsive to the generator speed, and means for supplying said control element with current from said power output.

3. A regulating system for a generator connected to a load circuit and driven by a prime mover, said system comprising an electrical control element for controlling the driving power supplied by the motor to the generator, an amplifier having a power output, a power input and a signal input, means for deriving from said load circuit a voltage variable with the amplitude and phase of the load current, means for deriving a voltage variable with the voltage applied to the load circuit, means for applying the vectorial sum of said voltages to said power input, means for obtaining a signal responsive to the speed of the generator, means for applying said signal to said signal input, and means for energizing said electrical control element from said power output, the phase relations of said voltages being such that their vectorial sum as applied to the power input of the amplifier will energize the control element to increase the power applied to the generator in accordance with increases of load.

4. A regulating system for a generator connected to a load circuit and driven by a prime mover, said system comprising an electric control element for controlling the torque supplied by the prime mover to the generator, means for deriving a voltage responsive to the power factor of the load circuit, a magnetic amplifier having an output, a power input and a signal input, said output being coupled to said control element, means for applying said voltage to said power input, and means for applying to said signal input a signal responsive to the frequency of said generator.

5. A regulating system for a generator connected to a load circuit and driven by a prime mover, said system comprising means for deriving a voltage variable with the load and with the phase of the load current, means for deriving a voltage whose phase is dependent on the load voltage, a circuit in which the derived voltages are combined vectorially, an amplifier having a power input connected to said circuit for receiving said vectorially combined voltages, said amplifier having a signal input circuit, means for deriving a signal responsive to generator output frequency and for applying the signal to said signal input, and means for employing the output of said amplifier to control the torque supplied to said generator.

6. A regulating system for an alternating current generator connected to a load circuit and driven by a prime mover, said system comprising an electric control element for controlling the driven power supplied to the generator, an amplifier having a power output, a power input and a signal input, said power output being coupled to said control element, means for supplying said power input with a voltage response to the generator load and its power factor, and means for supplying said signal input with a signal responsive to the generator output frequency.

7. A regulating system for an alternating current generator connected to a load circuit and driven by a prime mover, said system comprising an amplifier having a power output, a power input and a signal input, means for supplying said power input with a voltage responsive to the generator load and its power factor, means for supplying to the signal input a signal responsive to the generator output frequency, and means for employing the amplifier power output to control the driving power supplied to the generator.

8. A regulating system for an alternating current generator connected to a load circuit and driven by a prime mover, said system comprising means for deriving from said load circuit a voltage variable with the load current and in fixed phase relation therewith, means for deriving from said load circuit a voltage with a phase dependent upon the phase of the voltage applied to the load, a circuit for vectorially combining said derived voltages, an amplifier having a power output, a power input and a signal input, means for supplying said combined voltages to said power input, means for supplying to said signal input a signal responsive to the generator output frequency, and means for employing said power output to control the input torque supplied to the generator.

9. A regulating system for an alternating current generator connected to a load circuit and driven by a prime mover, said system comprising an electric control element for controlling the input torque applied to the generator, means including a current transformer coupled to the load circuit for deriving a voltage responsive to the true load on the generator, an amplifier having a power output, a power input and a signal input, means for coupling said power output to said control element, means for supplying said power input with said derived voltage, and means for supplying to said signal input a signal responsive to the generator output frequency.

10. A regulating system for an alternating current generator connected to a load circuit and driven by a prime mover, said system comprising an electric control element for controlling the input torque applied to the generator, means including a current transformer coupled to said load circuit for deriving a voltage variable with the load current, means for deriving from said load circuit a voltage proportional to the load voltage, means for vectorially combining said voltages, an amplifier having an output, a power input and a signal input, means for coupling said output to said control element, means for supplying to said power input the vectorial combination of said voltages, and means for supplying to said signal input a signal responsive to the generator output frequency, the vectorial combination of voltages being such that upon increase of resistive load on the generator the amplifier output will cause said control element to increase the torque applied to the generator, and upon decrease of resistive load on the generator to reduce the applied torque.

11. A regulating system for an alternating current generator connected to a load circuit and driven by a prime mover, said system comprising an electric control element for controlling the driven power supplied to the generator, a magnetic amplifier having a power output, a power input and a signal input, said power output being coupled to said control element, means for supplying said power input with a voltage responsive to the generator load and its power factor, and means for supplying said signal input with a signal responsive to the generator output frequency.

12. A regulating system for an alternating current generator connected to a load circuit and driven by a prime mover, said system comprising a magnetic amplifier having a power output, a power input and a signal input, means for supplying said power input with a voltage responsive to the generator load and its power factor, means for supplying to the signal input a signal responsive to the generator output frequency, and means for employing the amplifier power output to control the driving power supplied to the generator.

13. A regulating system for an alternating current generator connected to a load circuit and driven by a prime mover, said system comprising means for deriving from said load circuit a voltage variable with the load current and in fixed phase relation therewith, means for deriving from said load circuit a voltage with a phase dependent upon the phase of the voltage applied to the load, a circuit for vectorially combining said derived voltages, a magnetic amplifier having a power output, a power input and a signal input, means for supplying said combined voltages to said power input, means for supplying to said signal input a signal responsive to the generator output frequency, and means for employing said power output to control the input torque supplied to the generator.

14. A regulating system for an alternating current generator connected to a load circuit and driven by a prime mover, said system comprising an electric control element for controlling the input torque applied to the generator, means including a current transformer coupled to the load circuit for deriving a voltage responsive to the true load on the generator, a magnetic amplifier having a power output, a power input and a signal input, means for coupling said power output to said control element, means for supplying said power input with said derived voltage, and means for supplying to said signal input a signal responsive to the generator output frequency.

15. A regulating system for an alternating current generator connected to a load circuit and driven by a prime mover, said system comprising an electric control element for controlling the input torque applied to the generator, means including a current transformer coupled to said load circuit for deriving a voltage variable with the load current, means for deriving from said load circuit a voltage proportional to the load voltage, means for vectorially combining said voltage, a magnetic amplifier having an output, a power input and a signal input, means for coupling said output to said control element, means for supplying to said power input the vectorial combination of said voltages, and means for supplying to said signal input a signal responsive to the generator output frequency, the vectorial combination of voltages being such that upon increase of resistive load on the generator the amplifier output will cause said control element to increase the torque applied to the generator, and upon decrease of resistive load on the generator to reduce the appied torque.

16. A regulating system for an alternating current generator connected to a load circuit and driven by a prime mover, said system comprising an electrically controlled slip coupling for controlling the input torque applied to the generator, means including a current transformer coupled to the load circuit for deriving a voltage responsive to the true load on the generator, a magnetic amplifier having a power output, a power input and a signal input, means for coupling said power output to said slip coupling, means for supplying said power input with said derived voltage, and means for supplying to said signal input a signal responsive to the generator output frequency.

17. A regulating system for an alternating current generator connected to a load circuit and driven by a prime mover, said system comprising an electrically controlled slip coupling for controlling the input torque applied to the generator, means including a current transformer coupled to said load circuit for deriving a voltage variable with the load current, means for deriving from said load circuit a voltage proportional to the load voltage, means for vectorially combining said voltages, a magnetic amplifier having an output, a power input and a signal input, means for coupling said output to said slip coupling, means for supplying to said power input the vectorial combination of said voltages, and means for supplying to said signal input a signal responsive to the generator output frequency, the vectorial combination of voltages being such that upon increase of resistive load on the generator the amplifier output will cause said slip coupling to increase the torque applied to the generator, and upon decrease of resistive load on the generator to reduce the applied torque.

18. A regulating system for a generator connected to a load circuit and driven by a prime mover, said system comprising means for deriving a voltage variable with the load and with the phase of the load current, means for deriving a voltage whose phase is dependent on the load voltage, a circuit in which the derived voltages are combined vectorially, an amplifier having a power input connected to said circuit for receiving said vectorially combined voltages, said amplifier having a signal input circuit, means for deriving a signal responsive to generator output frequency and for applying the signal to said signal input, and means for employing the output of said amplifier to control the torque supplied to said generator, the latter means including a slip coupling connecting the generator and prime mover and controlled in response to the amplifier power output.

19. A regulating system for an alternating current generator connected to a load circuit and driven by a prime mover, said system comprising an amplifier having a power output, a power input and a signal input, means for supplying said power input with a voltage responsive to the generator load and its power factor, means for supplying to the signal input a signal responsive to the generator output frequency, and means for employing the amplifier power output to control the driving power supplied to the generator, the latter means including a slip coupling connecting the generator and prime mover and controlled in response to the amplifier power output.

References Cited in the file of this patent

UNITED STATES PATENTS

| | | |
|---|---|---|
| 2,396,851 | Hysler | Mar. 19, 1946 |
| 2,558,572 | Logan | June 26, 1951 |